United States Patent [19]
Koster

[11] Patent Number: 5,499,290
[45] Date of Patent: Mar. 12, 1996

[54] AIN NON-CALL ASSOCIATED SIGNALLING FOR SERVICE NODES AND SERVICE CONTROL POINTS IN A TELEPHONE SYSTEM

[75] Inventor: Karl Koster, Atlanta, Ga.

[73] Assignee: BellSouth Corporation, Atlanta, Ga.

[21] Appl. No.: 10,287

[22] Filed: Jan. 28, 1993

[51] Int. Cl.[6] .............................. H04M 3/00; H04M 7/00; H04Q 11/04; H04J 3/24
[52] U.S. Cl. ................. 379/242; 370/60.1; 370/94.1; 370/110.1; 379/95; 379/201; 379/230
[58] Field of Search .......................... 379/95, 201, 207, 379/229, 230, 242; 370/110.1, 94.1, 60.1

[56] References Cited

U.S. PATENT DOCUMENTS 5,369,695  11/1994  Chakravarti et al. ............... 379/230 X

OTHER PUBLICATIONS

IBM Technical Disclosure Bulletin, "Transparent Message Routing Between An SS#7 Network and X.25 Network," Aug. 1992, pp. 434–436.

Fraidoon Mazda, "Telecommunications Engineer's Reference Book", 1993, pp. 44/14–44/15.

Primary Examiner—Jeffery A. Hofsass
Assistant Examiner—Harry S. Hong
Attorney, Agent, or Firm—Robin, Blecker, Daley & Driscoll

[57] ABSTRACT

A telephone system in which a service node and a service control point are permitted to communicate with each other by adapting the central office switch to have a non-call associated signalling communication service which can be invoked by non-call associated signalling messages and which further utilizes the network access control and/or signalling channel of the service node.

44 Claims, 7 Drawing Sheets

Addressing For Service Switching Point (Central Office Switch) Originated Messages

|  | Signalling Point Code | Sub-System Number | Global Title |
|---|---|---|---|
| SCCP Called Address | Not Applicable | Not Applicable | As Indicated By Service Node In Destination Address Parameter |
| SCCP Calling Address | Central Office Switch's SPC | Sub-System Number For AIN | Not Applicable |

FIG. 4

Addressing For Service Control Point Response Messages

|  | Signalling Point Code | Sub-System Number | Global Title |
|---|---|---|---|
| SCCP Called Address | Central Office Switch's SPC | Sub-System Number For AIN | Not Applicable |
| SCCP Calling Address | Service Control Point's SPC | Sub-System Number Of AIN | Not Applicable |

FIG. 5

Addressing For Service Control Point Originating Messages

|  | Signalling Point Code | Sub-System Number | Global Title |
|---|---|---|---|
| SCCP Called Party Address | SPC Of Destination Switch | Sub-System Number For AIN | Not Applicable |
| SCCP Calling Party Address | SPC Of Service Control Point | Sub-System Number For AIN | Not Applicable |

FIG. 6

Addressing For Service Switching Point (Central Office Switch) Originating Messages

|  | Signalling Point Code | Sub-System Number | Global Title |
|---|---|---|---|
| SCCP Called Party Address | SPC Of Service Control Point | Sub-System Number For AIN | Not Applicable |
| SCCP Calling Party Address | SPC Of Switch | Sub-System Number For AIN | Not Applicable |

FIG. 7

AIN NON-CALL ASSOCIATED SIGNALLING FOR SERVICE NODES AND SERVICE CONTROL POINTS IN A TELEPHONE SYSTEM

BACKGROUND OF THE INVENTION

This invention relates to telephone systems and, in particular, to telephone systems which include central office switches adapted to provide advanced intelligent network (AIN) operations and services.

One method of providing services in an advanced intelligent network is to utilize service nodes or intelligent peripherals, e.g., telephone stations, private branch exchanges, voice mail systems, etc., which have various degrees of intelligence and which communicate with the central office switch using message based digital signalling protocols. In many of these telephone systems, the interface between a service node and the central office switch is an "integrated services digital network" (ISDN) interface. ISDN interfaces have two basic common configurations.

In a first configuration, the ISDN interface includes two channels commonly referred to as the "B" channels (usually 64 Kb/sec) which carry voice and/or user data information. This first configuration of ISDN interface also includes a third channel commonly referred as the "D" channel (16 Kb/sec) which carries telephone network access and/or control signalling information. ISDN interfaces of this first configuration are referred to as "basic rate" or 2B+D ISDN interfaces.

A second configuration of the ISDN interface is similar to the first configuration, but the interface includes 23 "B" channels for voice and data (usually at 64 Kb/sec), in addition to the one "D" channel for access and/or control signalling (in this case, also at 64 Kb/sec). This second configuration of the ISDN interface is referred to as a "primary rate" or 23B+D ISDN interface.

Both configurations of ISDN interface and their associated procedures support the invocation of supplementary services (i.e., requests above and beyond call establishment) through a protocol called the "Common Element" procedures. This allows requests to be associated with a current call (e.g., call transfer), as well as requests that are not directly associated with a current call. This particular latter subset of the Common Element procedures is called non-call associated signalling. A particular example might be non-call associated signalling which is used to indicate to a subscriber that a message is waiting (i.e., signalling used to turn on a message waiting indicator on a telephone station at a subscriber location).

Non-called associated signalling is conveyed in a Facility Information Element of the ISDN protocol. This information element is usually carried in a non-call associated message (e.g., the ISDN REGISTER message) which is identifiable to the central office switch. This message is first processed in the switch as defined by the ISDN Common Element procedures and then further processed in the switch as indicated and required by the specific service (e.g., a message waiting indication service).

A more thorough description of the specifications for ISDN interfaces used by the regional Bell telephone companies appears in documents known as Technical References published by Bellcore. These Technical References are based in part on relevant international standards established for ISDN signalling (namely Recommendations Q.931 and Q.932) and the relevant national standards. The Bellcore documents are identified by so called "TR numbers" and for ISDN interfaces and their associated central office requirements, the following Technical References have been developed: TR-NWT-01268, ISDN Primary Rate Interface Call Control Switching and Signalling Requirements for Class II Equipment; TR-TSY- 00268, ISDN Access Call Control Switching and Signalling Requirements, Issue 3; and TR-NWT-000864, Common Element Procedures for Service Control, Issue 1. An example of a specific service that utilizes the existing Common Element procedures can be found in TR-NWT-000866, ISDN Message Service. The aforesaid TRs and the aforesaid international and national standards are known in the telephone system art and their teachings are incorporated herein by reference.

In telephone systems utilizing conventional and ISDN interfaces, the central office switches have also been further adapted to include advanced intelligence network (AIN) capabilities so that the switches can provide additional services to the telephone subscribers of the system. Central office switches adapted in this manner are generally referred to as "service switching points". The additional services that can be provided by such service switching points include display based delivery of the calling party's name, audio delivery of the calling party's name, automatic rerouting of calls based on network failure, etc.

In conjunction with providing these additional services, a central office switch or service switching point must, in many cases, communicate with an intelligent computer or so-called "service control point" to obtain information necessary to complete the service. Thus, for example, when the central office switch encounters a call to a called subscriber who subscribes to a service for display based delivery of a calling party's name (sometimes referred to as "Calling Name Delivery"), the central office switch will suspend its normal call set-up processing to query a service control point having a data base which correlates directory numbers with subscriber names. The query by the central office switch will request the service control point to search its data base for the subscriber name having the calling directory number.

Once this calling subscriber information is obtained from the service control point, the central office switch will complete the call set-up procedure. When the call is established, the central office switch will then provide the calling subscriber name to the called subscriber utilizing analog transmission technologies and thus complete its Calling Name Delivery service.

The interface between a central office switch and its service control points in a telephone system is collectively known as "SS7". The SS7 interface is internal to the telephone system and only accessible through certain types of telephony related equipment (referred to as "network elements"). The procedures and protocols of SS7 are subdivided into functional groupings as identified by protocol layers and each network element processes certain protocol layers. The signalling between an AIN switch and a service control point largely involves the Transaction Capabilities Application Part of SS7 more commonly known as TCAP and to a lesser extent, the Signalling Connection Control Part, more commonly known as SCCP.

Routing for the SS7 TCAP messages is usually provided by a signalling transfer point which communicates with the central office switch and the various service control points. The routing functions are defined in the Signalling Connection Control Part of SS7. The central office switch formulates a signalling connection control part message for carrying each TCAP message. The signalling connection control part message also includes origination (calling party) address information and destination (called party) address information.

When a switch sends a TCAP message, the switch's origination or calling party address information in the corresponding signalling connection control part message contains a so-called "signalling point code" which uniquely identifies the switch. The destination or calling party address information also includes a sub-system number which identifies a particular application process of the switch associated with processing the TCAP message. If AIN processes are involved, the sub-system number is usually a generic AIN identifier which corresponds to one of the generic AIN versions (i.e., AIN Release 0, AIN Release 0.1 or potentially AIN Preliminary Release 0.2).

The destination or called party address information in the signalling connection control part message contains either a signalling point code and sub-system number which identify the service control point and the required application processing or a "global title" identifier and a "Translation type" identifier. The latter two identifiers permit the signalling point code and the sub-system number of the destination service control point to be derived via a translation table at the signalling transfer point.

When the signalling transfer point receives a signalling connection control part message, the signalling transfer point routes the message to the destination service control point based upon the signalling point code and sub-system number sent in the message or derived from the translation table at the signalling transfer point. Upon receipt of the routed message, the destination service control point recognizes the type of processing that is to be carried out from the sub-system number in the called party information.

After completing its specific processing as determined by the TCAP message contents, the service control point may formulate an acknowledgement TCAP message. This TCAP message is transmitted in a signalling connection control part message to the signalling transfer point. The signalling transfer point routes the message back to the central office switch which is identified in the message by its signalling point code in the called party information. Upon receipt of the signalling connection control part message, the switch retrieves the TCAP message to obtain the information provided by the service control point to complete the AIN service.

A more extensive description of the specifications for SS7 interfaces, including the signal connection control part messages and TCAP messages, is provided in Bellcore TR-NWT-000246, Signalling System Number 7, Issue 2. Also, the AIN Release 0.1 and the Preliminary AIN Release 0.2 are described in detail in Bellcore Technical Requirements TR-NWT-001285, TR-NWT 001284 and Technical Advisories TA-NWT-1299, TA-NWT-1298 and TA-NWT-001129. The aforesaid Bellcore TRs and TAs are also incorporated herein by reference and likewise are known in the telephone system art.

In the above-described non-call associated signalling schemes defined in TCAP in SS7 and in the Common Element Procedures of ISDN, each non-call associated message includes a "component" which indicates the status of the operation. The following components are used: (a) Invoke; (b) Return Result; (c) Return Error; and (d) Reject.

The Invoke component in a message indicates that the identified operation in the message is being requested. The Return Result component indicates that the associated operation is being positively acknowledged and the Return Result may contain information necessary in providing the acknowledgment (i.e. the information requested). The Return Error component indicates that the associated operation is being negatively acknowledged, i.e., that the entity that received the message was not able to carry out the requested operation. The Return Error component may contain information as to the reasons why the operation could not be carried out. The Reject component indicates that the entity that received the message was not able to understand the nature of the requested operation at all.

As above-indicated, a central office switch communicates with its service control points based on the aforesaid TCAP SS7 messages, while it communicates with its service nodes based on the aforesaid ISDN messages. The central office switch does not permit the service control points to be accessed by the service nodes (or any other subscriber or customer premises equipment) or vice-versa, i.e., the service nodes to be accessed by the service control points, via directory dialing or any other means. This is a disadvantage since access of the service nodes and the service control points to each other in a telephone system may be desirable to permit AIN processes to be directly requested or effected.

It is, therefore, an object of the present invention to provide a telephone system in which the service nodes and the service control points of the system can access one another in an efficient and cost effective manner.

It is a further object of the present invention to provide a telephone system meeting the above objective in which ISDN interfaces with ISDN messages are used between the service node and the central office switch and SS7 interfaces with TCAP messages are used between the central office switch and the service control points.

It is yet a further object of the present invention to provide a telephone system meeting the above objectives and which utilizes existing procedures to the greatest extent possible.

It is still a further object of the present invention to provide a service node, central office switch and service control point for a telephone system meeting the above objectives.

SUMMARY OF THE INVENTION

In accordance with the principles of the present invention, the above and other objectives are realized in a telephone system of the above-type in which a central office switch is adapted to have a non-call associated signalling class of communication service (referred to herein as "AIN non-call associated signalling") in which the switch allows a service node and a service control point to communicate or access each other using non-call associated signalling supportable by the respective interfaces connecting the service node and the service control point to the switch. Communication between the switch and the service node is over the telephone network access control and/or signalling channel of the interface connecting the service node to the switch. With the central office switch adapted in this manner, messages (e.g., requests, data, etc.) can be transmitted between the service node and the service control point via the switch using existing facilities and interfaces and without the need to add further protocols between the switch and service control point or the between the switch and service node.

In the embodiment of the invention to be disclosed hereinafter, the interface to the service node is an ISDN interface and non-call associated signalling is carried between the service node and the switch on the access control and/or signalling channel of the ISDN interface, i.e., on the D channel. The switch and the service control point, in turn, communicate via a SS7 interface and non-call associated signalling as defined by TCAP.

Accordingly, the central office switch, in effecting its AIN non-call associated signalling receives the AIN non-call associated signalling on the ISDN interface from the service node and converts it to AIN non-call associated signalling in the TCAP protocol on the SS7 interface and sends it to the service control point. The switch accomplishes this without having to decipher or process the application level data that is passed between the service node and service control point (i.e., the envelop_contents parameter discussed hereinafter).

In the other direction, the switch in receiving the AIN non-call associated signalling on the SS7 interface from the service control point using the TCAP protocol converts this to the corresponding AIN non-call associated signalling on the ISDN interface and sends it to the service node. The switch, again, does this without having to decipher of process the application level data that is passed from the service control point to the service node. An efficient and cost effective way of communicating requests and data between the service node and the service control point is thereby effected.

In the disclosed embodiment, each AIN non-call associated message includes a component as above-mentioned (i.e., Invoke Return Result, etc.) which identifies and conveys information regarding an operation whose presence signifies to the central office switch that the service being invoked is AIN non-call associated signalling. The identified operation includes parameters which indicate the address of the originating entity (called origination_address), the address for the destination entity (call destination_address), and the message contents which is the data to be sent from the service node to the service control point to effect the desired AIN service (called the envelope_contents).

The coding of the first two elements is based on the coding format of the existing ISDN Called Party Address and Calling Party Address information elements. These protocol elements provide a variety of methods to indicate various addressing methods using the standard coding format. The coding of the envelop_contents is defined and specified between the service node and the service control point. It should be noted that other parameters can be added to facilitate the processing of the envelop_contents field in the service node and service control point. One such parameter is the envelope_format_indicator which can be used to define the structure and format of the envelop_contents. However, the contents of this parameter is not required to be known or deciphered by the switch in providing the AIN non-call associated signalling. The switch uses the origination and destination addresses, while replicating and without deciphering or processing (i.e., acting on) the message contents in effecting its conversion processing.

Specifically, the switch processes each AIN non-call associated ISDN message using ISDN Common Element procedures followed by the conversion processing which results in an AIN non-call associated TCAP message having an operation corresponding to the operation in the ISDN message and parameters (origination address, destination address and message contents) which are the same as those in such message. Additionally, in the disclosed embodiment, two ISDN operations and two corresponding TCAP operations are used. One of the ISDN operations and its corresponding TCAP operation require an acknowledgement or response from the receiving entity (either the service node or the service control point) and are used to carry requests or queries. The other ISDN operation and its associated TCAP operations require no acknowledgement or response from the receiving entity (again, either the service node or the service control point) and are used to carry data such as the notification of an event.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
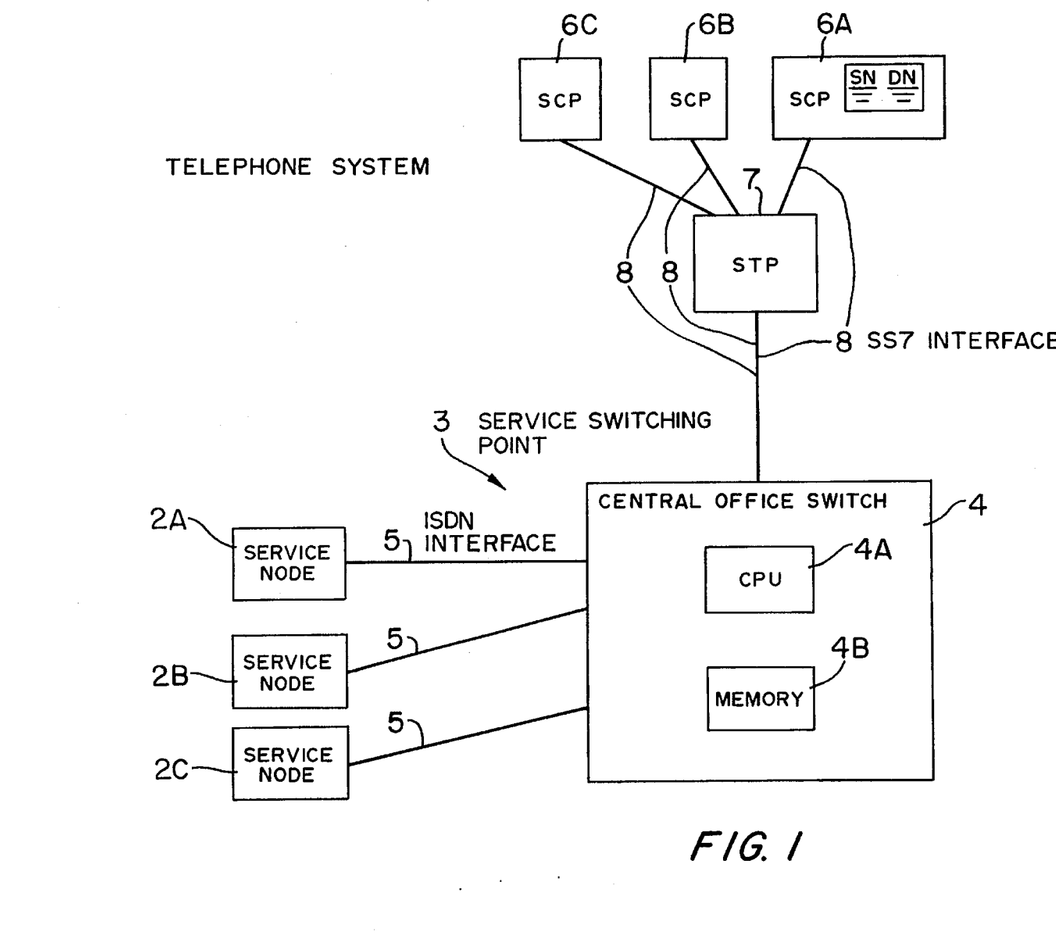
FIG. 1 shows a telephone system in accordance with the principles of the present invention.

FIG. 1 shows a block diagram of a telephone system 1 in accordance with the principles of the present invention. The system 1 includes a plurality of service nodes or intelligent peripherals 2A, 2B, 2C each of which communicates with a service switching point 3. The service switching point 3 is in the form of a central office switch 4 having AIN capabilities.

The switch 4 can, for example, be a program driven ATT #5 ESS with the AIN processes programmed in. The switch includes a central processing unit 4A and a memory 4B.

Each of the service nodes 2A, 2B, 2C is connected to the switch 4 via a first type of interface, shown as an ISDN interface 5. For present illustrative purposes, it is assumed that each ISDN interface 5 is a basic rate interface and, thus, includes two voice and/or data channels, i.e., two B channels, and one telephone network access control and/or signalling channel, i.e. one D channel. However, the principles of the present invention are intended to extend to the use of interfaces 5 which are primary rate interfaces containing 23B+D channels or which are other like interfaces.

The switch 4, in the present example, is adapted to support conventional non-call associated signalling used in connection with certain services associated with the ISDN interface. This signalling is carried out using non-call associated ISDN messages (first-type interface messages) carried in the ISDN D channel and processed by the switch via Common Element procedures and other processes. Such Common Element procedures are defined in the Bellcore TRs referenced above, while the procedures for a given service (such as a message waiting indication service) would be specifically defined for the service.

The service nodes 2A, 2B and 2C are also assumed to contain intelligence. Typically, each node might be a so-called "smart PBX" or a "smart phone" or like intelligent equipment or peripheral.

The system 1 also includes a number of service control points 6A, 6B and 6C which interact with the switch 4 to permit it to carry out its AIN services. Signals between the switch 4 and the service control points are routed through a signalling transfer point 7 using a second type interface, shown as SS7 interface 8. These signals are embodied in non-call associated signalling TCAP messages (second type interface message) which are carried by signalling connection control part messages of the SS7 interface in the manner discussed above.

Each service control point 6A, 6B, 6C might typically include a computer having intelligence and an accessible data base. Each service control point, moreover, processes the TCAP messages carried in the signalling connection control part messages routed to it by the signalling transfer point 7. In the present illustrative case, the service control point 6A is shown as containing a data base which correlates directory numbers (DN) to subscriber names (SN) and, thus, is usable by the switch 4 to carry out an AIN Calling Name Delivery service.

As can be appreciated, since non-call associated signalling TCAP messages are used by the switch 4 to communicate with its service control points 6A, 6B, 6C and since ISDN messages are used by the switch 4 to communicate with the service nodes 2A, 2B and 2C, the switch 4 does not permit the service control points 6A, 6B and 6C to be accessed by the service nodes 2A, 2B, 2C, or vice-versa, i.e., the service nodes 2A, 2B, 2C to be accessed by the service control points 6A, 6B, 6C, by directory number dialing or any other means. In accordance with the principles of the present invention, the switch 4 is further adapted to permit such access by including in the switch a further non-call associated signalling communication service, i.e., AIN non-call associated signalling.

This class of service of the switch 4 utilizes the non-call associated signalling procedures of the access control D channel of the ISDN interfaces 5 (these procedures are defined in the above referenced TR-NWT-000864) and the TCAP procedures of the SS7 interface 8 (these procedure are defined in the above referenced TR-NWT-00246). Specifically, the switch 4 is adapted to convert AIN non-call associated D channel ISDN messages, i.e., non-call associated ISDN messages specifying AIN non-call associated signalling, to AIN non-call associated TCAP messages and vice-versa.

In carrying out this conversion, the central office switch 4 repackages a component conveyed in an ISDN message into a component conveyed in a TCAP message and vice-versa, while replicating and without deciphering or processing the request or data (i.e., the envelope_contents parameter) in the message. The enveloped message is then coupled by the switch 4 to the appropriate interface and deciphered and processed at the destination end (either the service node or service control point) and the appropriate action taken at that end.

This action might include the sending of an acknowledgement or response to the originating end via a further AIN non-call associated message (either an ISDN message for the service node or a TCAP message for the service control point). This further message identifies to the switch that it requires AIN non-call associated signalling, thereby causing the switch to convert the message accordingly and send it on to the originating end.

More particularly, in the present illustrative case, the switch 4 is adapted to perform its conversion processing by repackaging each AIN non-call associated ISDN message into an AIN non-call associated TCAP "package type" (a specific type of TCAP message) and vice-versa. Specifically, the switch 4 provides conversion or mapping of ISDN REGISTER messages and ISDN RELEASE COMPLETE messages with a particular one of the following TCAP package types: Query with Permission, Unidirectional, Response, and Abort; and vice-versa. Table 1 shows the particular mappings carried out by the switch 4.

| AIN ISDN Message | AIN TCAP Package Type |
| --- | --- |
| REGISTER | Query with Permission |
| REGISTER | Unidirectional |
| RELEASE COMPLETE | Response |
| RELEASE COMPLETE | Abort |

From Table 1, it is apparent that the switch 4 maps a received ISDN REGISTER messages into one of two different types of TCAP Package Types. The switch 4 selects the Package Type based on the ISDN operation specified in the ISDN Facility Information Element. If the ISDN operation requires a response or acknowledgement (identified hereinafter as an EnvelopOpClass2 operation), then the switch 4 uses the Query with Permission TCAP Package Type. If the ISDN operation does not require a response (identified hereinafter as EnvelopOpClass5 operation), then the switch 4 uses the Unidirectional Package Type TCAP message.

It is also apparent the switch 4 also maps a received ISDN RELEASE COMPLETE message into one of two different TCAP Package Types. The switch 4 selects the Package Type based on whether the RELEASE COMPLETE was received and processed by the switch 4 with or without errors. If errors are encountered as detailed in the Common Element procedures, an Abort Package Type is selected. If no errors are encountered, then a Response Package Type is selected.

The switch 4 also maps two different acknowledgement TCAP Package Types to an ISDN RELEASE COMPLETE message. Under normal conditions, the Response Package Type is received by the switch from the service control point and is mapped to a RELEASE COMPLETE message. If an error occurs, the Abort Package Type is generated by the service control point and is received by the switch and it is mapped to the RELEASE COMPLETE message. These error conditions are generic error procedures that are defined in the ISDN SS7 procedures as discussed in the above-referenced TRs.

Each of the ISDN messages or TCAP Package Types (with the exception of the Abort Package Type) also contains the above-mentioned "component" which describes the status of the operation specified in the message. In the present case, the switch 4 maps the particular components specified in the ISDN Common Element Procedures with the particular components specified in the AIN TCAP messages of SS7 as specified below in the Table 2.

TABLE 2

| ISDN Component Type | TCAP Component Type |
| --- | --- |
| Invoke | Invoke (last) |
| Return Result | Return Result (last) |
| Return Error | Return Error |
| Reject | Reject |

As can be appreciated from Table 2, in the present case, since each component specifies the status of an operation which identifies the AIN non-call associated signalling of the switch 4, the switch 4 maps each component and any parameters it conveys, unchanged.

Having described the general conversion processes of the switch 4, the following description describes in more detail the operation of the switch for messages originating at a service node 2A, 2B or 2C and addressed to one of the service control point 6A, 6B or 6C. The operation of the switch for messages originating at a service control point and addressed to a service node will be apparent from the description presented. Also, the standards and processes governing the ISDN interfaces 5, the ISDN messages, the SS7 interface 8, the TCAP messages and the AIN procedures as outlined in the above-referenced Bellcore TRs and other above-referenced references are known and will not be repeated.

As above-noted, in adapting the switch 4 to provide the AIN non-call associated signalling service, two ISDN operations and corresponding TCAP operations are defined which identify the service. These operations, in turn, when recognized by the switch, then invoke or cause the switch to undertake the necessary repackaging and conversion procedures.

In the present illustrative case, two invoking ISDN operations called "EnvelopOpClass2" and "EnvelopOpClass5" having two corresponding TCAP operations TCAP__ Env__Class 1 and TCAP__ Env__Class 4 are established for originating messages at a service node. These operations serve to identify to the switch 4, to the service nodes 2A, 2B, 2C and to the service control points 6A, 6B, 6C that the messages are connected with the AIN non-call associated signalling of the switch 4 and should be processed in accordance therewith. Of course, other names could have been selected for these operations to provide the required identification.

The ISDN EnvelopOpClass2 operation and its associated TCAP TCAP_Env_Class1 operation are used where a response or acknowledgement is required from the receiving network element, e.g., where a request requiring an answer is made of the service control point by a service node. The ISDN EnvelopOpClass5 operation and its corresponding TCAP_Env_Class4 operation, in turn, are used where no response or acknowledgement is required or expected, e.g., in notification of an event where data is to be transmitted from a service node to a signalling control point.

The presence of either of the above two ISDN operations in a Facility Information Element (FIE) of an ISDN REGISTER message on the D channel of a service node acts as an identifier which identifies the message to the switch 4 as requiring its AIN non-call associated signalling conversion processing. To permit the switch 4 to perform this processing, each operation requires three parameters: an origination_address (address of the originating or sending service node); a destination_address (the address of the destination or receiving service control point) and the envelope_contents (data to be sent to or request to be made of the destination signal control point). The REGISTER message also contains a Facility information element which indicates a Invoke component.

The switch 4 processes the REGISTER message containing the Facility Information Element according to the aforementioned Common Element Procedures specified for ISDN messages. These procedures ensure that the message contains the appropriate protocol, encoding and information elements and that the message is syntactically correct. If one or more of these are not confirmed, the switch will respond with a RELEASE COMPLETE message containing a Return Error or Reject component, as discussed further hereinbelow. If all characteristics are confirmed, the switch 4 then proceeds with the necessary processing of the message to communicate the envelop_contents to the service control point identified by the destination address information.

The switch 4 proceeds by first verifying that the origination address in the message is associated with the particular ISDN interface 5 and that the interface does subscribe to the AIN non-call associated signalling service of the switch. The switch then screens the destination address against a list of allowable destinations for that origination address. The switch 4 then determines whether there are any call gaping procedures active which would cause TCAP messages that originate from the switch to be queued or dropped. If errors are encountered in any of these checks or call gaping is encountered, the switch will respond to the service node again with a RELEASE COMPLETE message containing a Return Error or Reject component, as is further discussed hereinbelow.

If no errors or call gaping are encountered, the switch 4 then repackages the REGISTER message into a TCAP message having the corresponding component and operation that contains the same three parameters, i.e., origination_address, destination_address, and envelope_contents. The switch then formulates a signalling connection control part message which transports the TCAP message and which is sent over the SS7 interface to the signalling transfer point 7 for routing to the appropriate service control point. This signal and its routing will also be discussed further hereinbelow.

As above-described, the TCAP message is formed by the switch 4 as a particular TCAP package type depending upon the particular operation specified in the REGISTER message. If the Facility Information Element in the REGISTER message contains an EnvelopOpClass5 operation (this operation requires no acknowledgement or response from the destination service control point), the switch 4 forms a Unidirectional package type TCAP message containing an Invoke (last) component with a TCAP__En__v Class4 operation. The switch 4 then sends this message via the above-mentioned signal connection control part message to the signal transfer point 7. The switch 4 then releases the ISDN call reference allocated to the service node in the aforementioned by sending an ISDN RELEASE COMPLETE message with a Return Result component over the D channel of the ISDN interface. This message completes the transaction in the usual ISDN fashion by including a Facility Information Element with a ISDN Return Result. The Return Result indicates that the SS7 TCAP message has been sent by the switch.

If the Facility Information Element in the ISDN REGISTER message contains an EnvelopOpClass2 operation (this operation requires an acknowledgement from the service control point), the switch 4 forms a "Query with permission"

package type TCAP message again with an Invoke (last) component and, in this case, with a TCA___P Env___Class 1 operation. This TCAP message is sent by the switch 4 to the signalling transfer point 7 via a signalling connection control part message for routing to the appropriate service control point.

The switch 4 then waits for a response or acknowledgement. This response or acknowledgement is generated by the service control point in answer to the query in the envelope___ contents of the TCAP message, i.e., in answer to the request from the originating service node. Upon receipt of a response, the switch 4 then sends an ISDN RELEASE COMPLETE message with an Facility information element that indicates a Return Result component. The RELEASE COMPLETE releases the ISDN call reference, and the Return Result component contains the answer of the signalling control point to the service node request.

Figure 2:
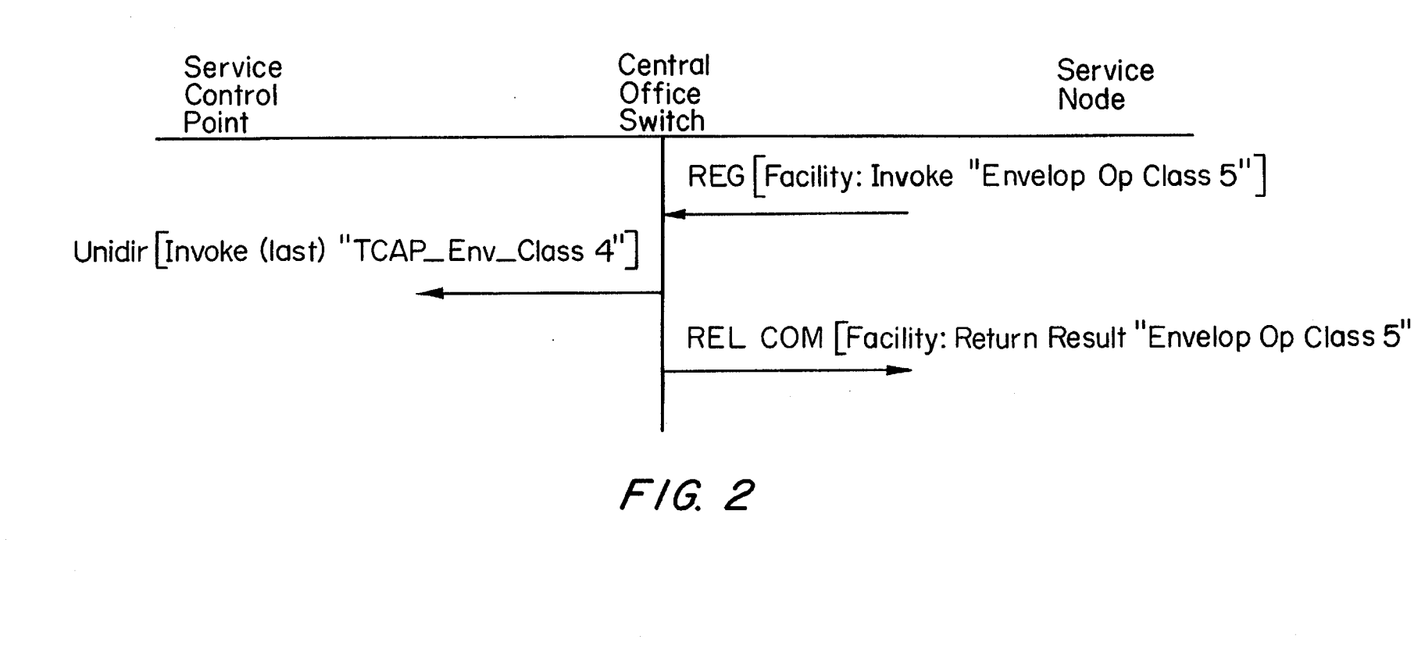
FIG. 2 illustrates a summary of the normal message flow in the system of FIG. 1 resulting from one-type of AIN non-call associated ISDN signalling class of operation.
Figure 3:
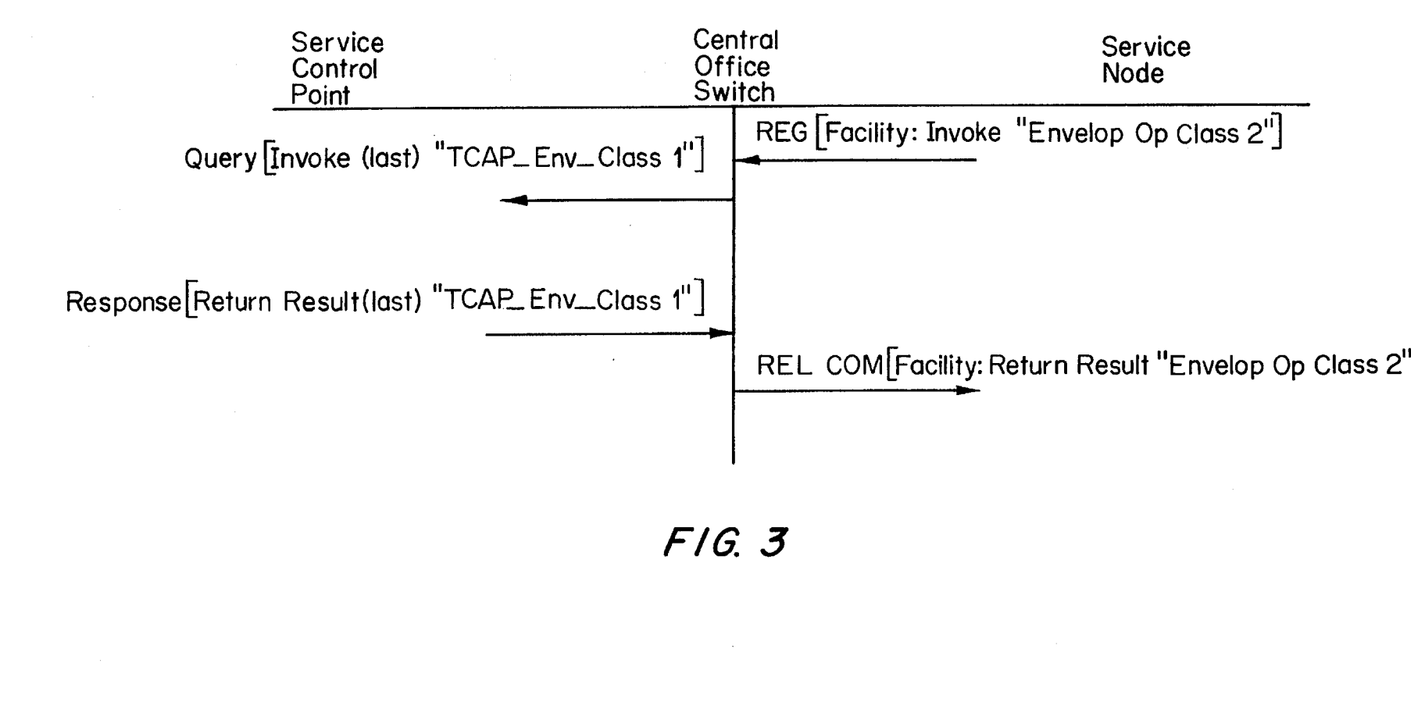
FIG. 3 illustrates a summary of the normal message flow in the system of FIG. 1 resulting from a second-type of AIN non-call associated ISDN signalling class of operation.

FIG. 2 illustrates the above processing by the switch 4 with respect to EnvelopOpClass5 operation. EnvelopOpClass2 operation of the switch 4, in turn, is illustrated in FIG. 3.

As above-noted, the switch 4 transmits each converted TCAP message to the destination service control point via a signalling connection control part message. As also above-noted, the latter message is routed by the signalling transfer point 7 and, in addition to the TCAP message, includes called party and calling party address information.

The calling party address information in the signalling connection control part message contains the signalling point code (SPC) of the switch 4 and the sub-system number (SSN). The sub-system number is determined by the particular AIN version (AIN Release 0.1 or 0.2) which is providing the AIN non-call associated signalling processing of the switch. The called party information, in the present illustrative case, specifies a global title and a Translation Type which are to be used by the signalling transfer point 7 to determine the signalling point code and sub-system number for the destination service control point.

At the signalling transfer point 7, the global title and Translation Type in the called party address are translated by the translation table at the signalling transfer point into the signalling point code and sub-system number for the destination service control point. The signalling transfer point then routes the message to the service control point having the determined signal point code.

When the message is received at the service control point, the service control point recognizes from the sub-system number that the message is to be processed based on its AIN processing. Using this processing, the service control point retrieves the TCAP message and performs the specific AIN processing required by the envelope contents contained in the envelop operation. After this processing, if an acknowledgement or response is required, the service control point formulates a TCAP Response message with the Return Result Component containing the appropriate acknowledgement.

The service control point incorporates the TCAP message into a signalling connection control part message having the required called and calling party information. In this case, the calling party information contains the signalling point code of the service control point and the sub-system number associated with the AIN processing used to generate the AIN acknowledgement or response. The called party information, in turn, contains the signal point code of the switch 4 and a sub-system number of the process in the switch associated with the message (in this case, the sub-system number for the AIN non-call associated signalling processing of the switch).

The signalling connection control part message is then sent by the service control point to the signalling transfer point 7. The signalling transfer point routes the message to the switch 4 as identified by the signal point code in the called party information. The switch 4 recognizes from the sub-system number that the message requires AIN processing. It also recognizes from the TCAP operation indicated that the AIN non-call associated signalling service is required. The switch then converts the TCAP message as previously described to produce an AIN ISDN RELEASE COMPLETE message with a Facility Information element that contains the corresponding component.

The ISDN RELEASE COMPLETE message is then transmitted on the D-channel of the appropriate ISDN interface to the originating service node. The service node then recovers from the Facility Information Element the component contents, i.e., the Return Result, which contains the desired response or acknowledgement from the service control point.

Figure 4:
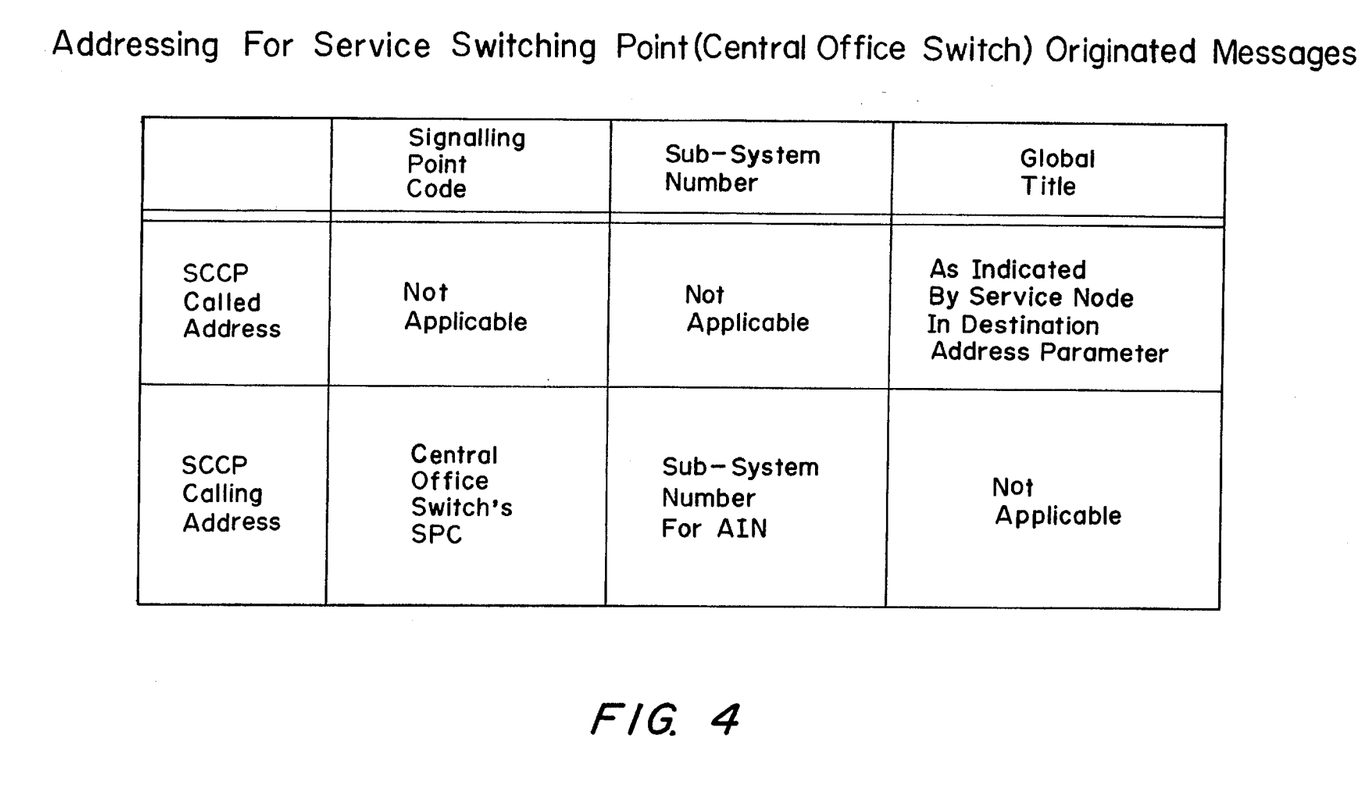
FIG. 4 shows a table summarizing the signalling connection control part (SCCP) addressing for messages directed to the service control point from the central office switch in the system of FIG. 1.
Figure 5:
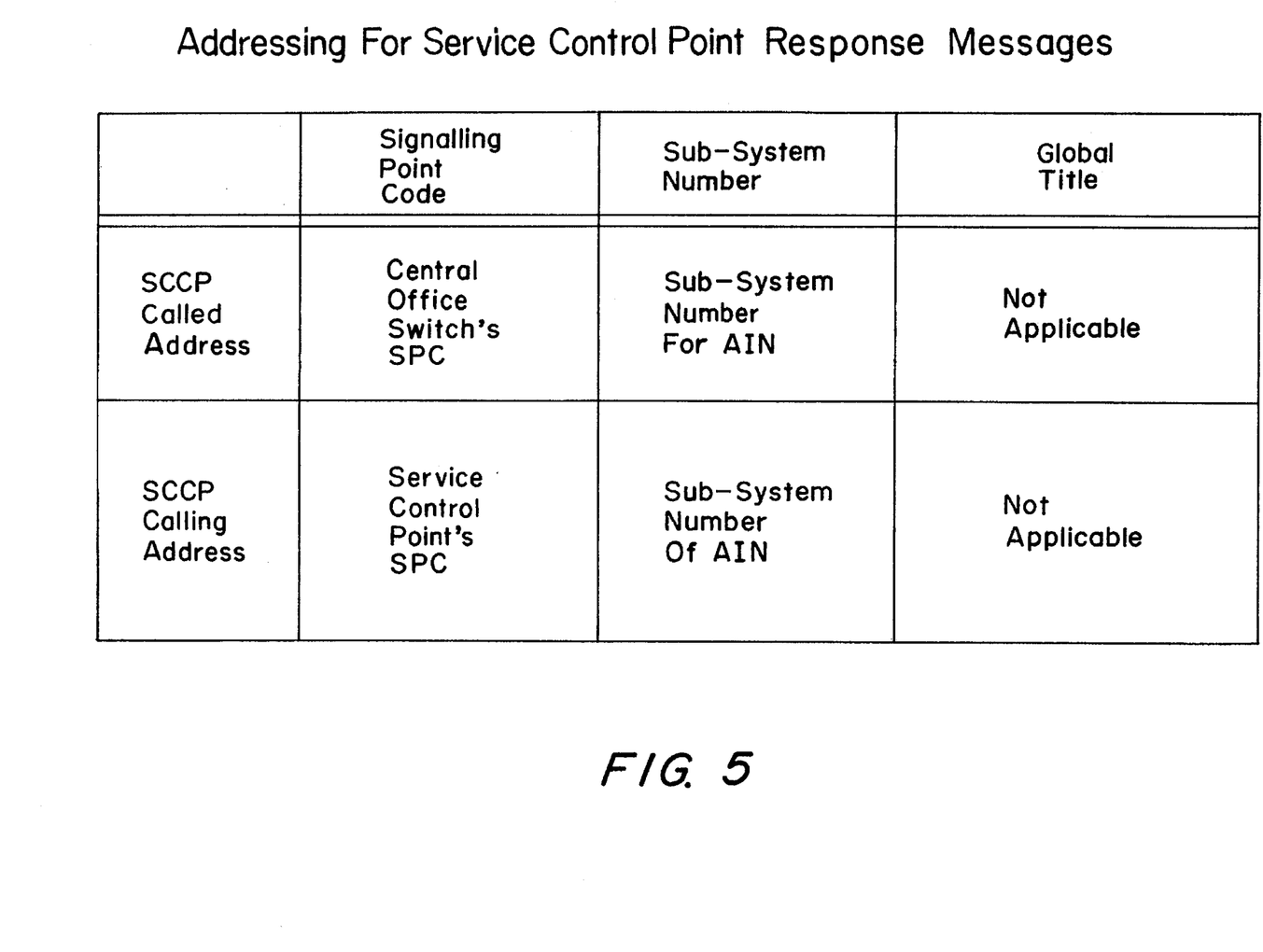
FIG. 5 shows a table summarizing the signalling connection control part addressing for response messages from the service control point of the system of FIG. 1.

FIG. 4 is a table summarizing the above signalling originating from the switch 4 to a service control point. FIG. 5 is a similar table summarizing the signalling response from the service control point to the switch.

Figure 6:
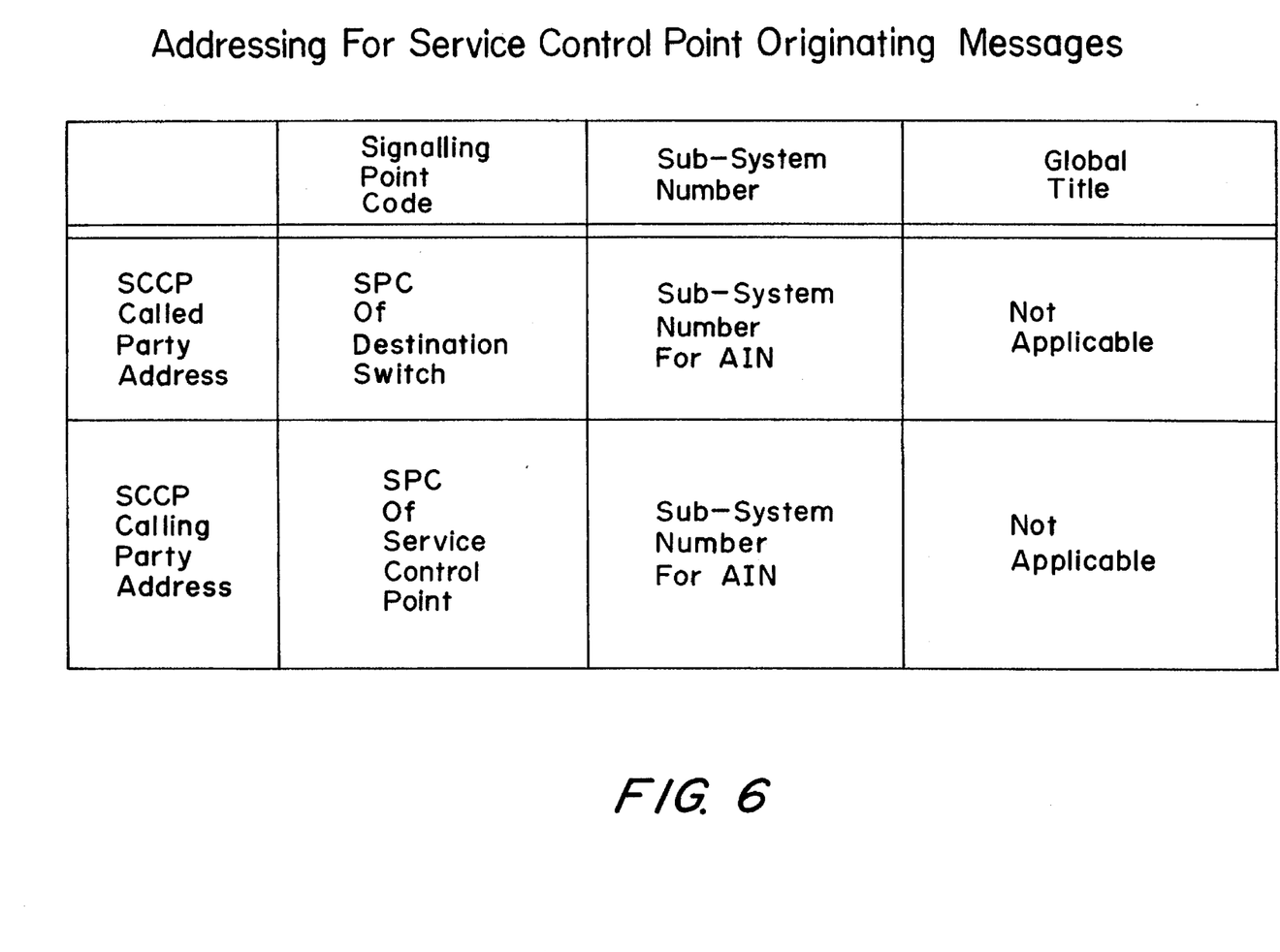
FIG. 6 shows a table summarizing signalling connection control part addressing for messages directed to the central office switch from the service control point in the system of FIG. 1.
Figure 7:
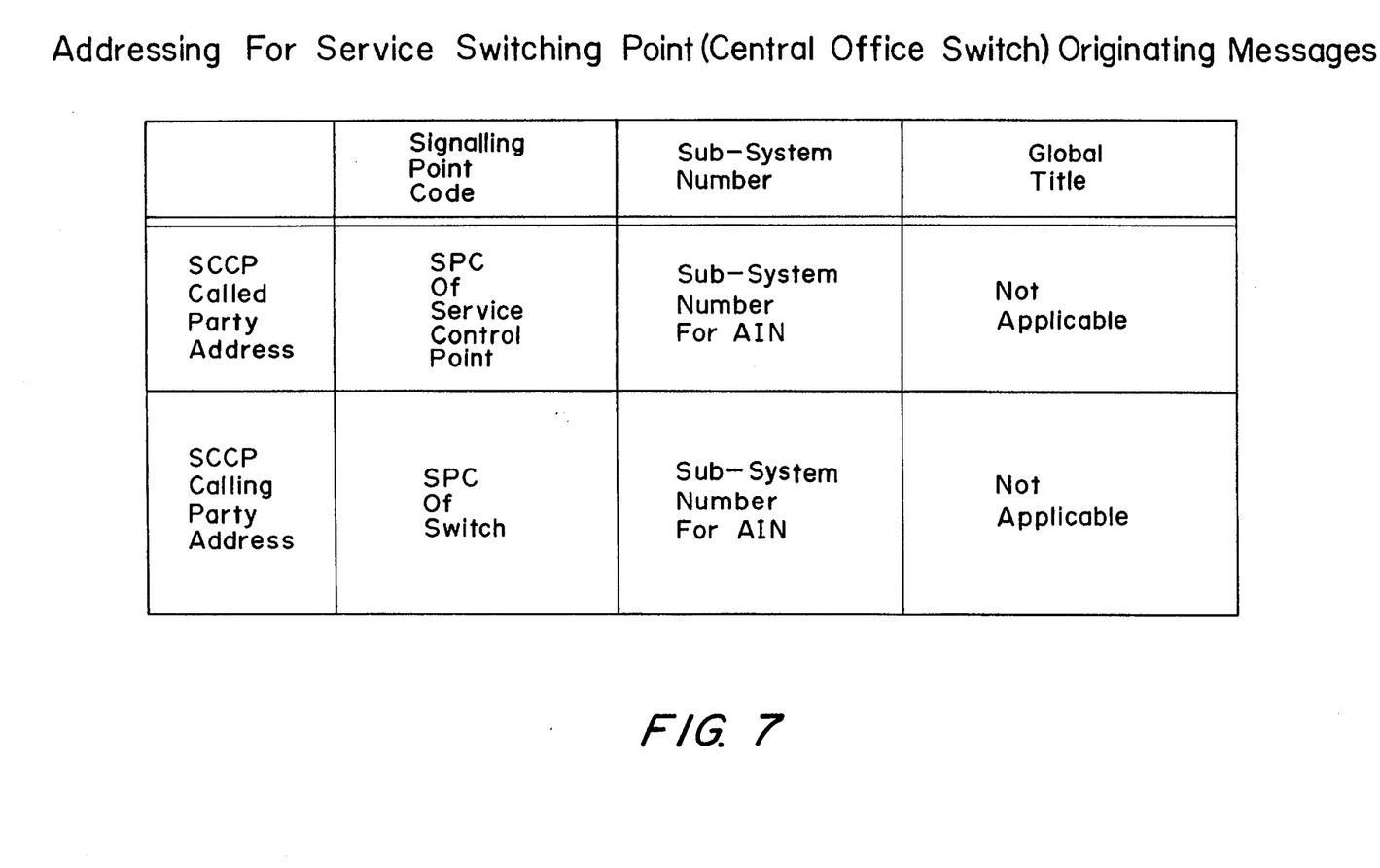
FIG. 7 shows a table summarizing the signalling connection control part addressing for the response messages from the switch to the service control point of the system of FIG. 1.

For instances of AIN non-call associated signalling initiated by a service control point, the role of the sending and receiving entities is reversed from what is described above. The operation is very similar except that global title translation is not used; the signalling point code and subsystem number are populated by the network element sending the message. When a service control point originates a message, it indicates itself as the calling party and indicates the desired target switch as the called party. The response from the switch, if any, indicates itself as the calling party and the service control point as the called party. These operations are summarized in FIGS. 6 and 7, respectively.

In the AIN non-call associated signalling processing discussed above, certain checks, verifications and validations are made of the contents of the messages processed by the switch 4 and by the service control points. If these checks, verifications and validations are not satisfied, the switch 4 will send to the service node a RELEASE COMPLETE message with a Facility Information Element containing a Reject or a Return error component.

A Reject component will be sent if the protocol verification of a message by the switch processing indicates an error (defined in TR-NWT-00064). A Return Error component will be sent, on the other hand, if there is an error associated with the ISDN interface of a particular service node, with the switch 4 or with the SS7 interface. Examples of possible conditions which will result in a Return Error are the following: incorrect service node origination address; AIN non-call associated signalling not authorized for the particular service node; unauthorized destination address; missing and/or invalid parameters in the origination address, destination address or envelope contents; denial of the AIN non-call associated signalling request due to call gaping; failure of the service control point to respond to a query within a specified time; and a Return error or reject error received from service control point. The occurrence of any of the above errors should prevent the switch 4 from formulating and transmitting a TCAP message if it has not already done so.

Additionally, if the switch 4 receives any messages in error as defined in the Common Element procedures, it is adapted to treat them as defined in the Common Element procedures. One such error is when a service node initiates an ISDN REGISTER message containing a AIN non-call service request and the request is of the nature that requires a response and the service node then also sends a RELEASE COMPLETE thus prohibiting the switch 4 from sending a response. In such cases, the switch 4 would not send the Query Package Type containing the TCAP_ENV_Class1 operation if it has not already done so. If the switch has already sent this, then the switch would send an ABORT TCAP message to the service control point after receiving the RELEASE COMPLETE message.

As above-indicated, the switch 4 is adapted to map only certain of the TCAP message types (see, Table 1) that contain TCAP components (see Table 2) with the aforementioned operations to the corresponding ISDN messages and components. Accordingly, if the switch 4 receives other TCAP package types (i.e., Query without Permission, Conversation without Permission, Conversation with Permission) which specify the AIN non-call associated signalling, TCAP package types having other components ((invoke (not last); return result (not last)) indicating AIN non-call associated signalling, or components that contain operations other than TCAP_Env_Class1 or TCAP_Env_Class2, these should not result in mapping to a corresponding ISDN message. Instead the switch 4, should return an Abort Package Type in the first case, a Response Package Type containing a Reject component in the second case to the service control point, and for the third case, the switch should respond to the given operation as defined by that particular operation.

The AIN non-call associated signalling service of the switch 4 can be used in a variety of applications. One application might be allowing a service node (in the form of an intelligent PBX) to carry out an AIN Calling Name Service by giving the service node access to the service control point 6A containing the directory number and subscriber name data base.

In such an application, the service node would transmit an ISDN REGISTER message containing a Facility Information Element indicating an Invoke component with an EnvelopOpClass2 operation. The EnvelopOpClass2 would contain an origination address corresponding to the service node, a destination address corresponding to the service control point 6A and envelope_contents in the form of a query to identify a calling subscriber name associated with a given directory number. The AIN switch 4 would then convert this component and operation in the ISDN REGISTER MESSAGE into a corresponding component and TCA__P Env__Class 1 operation in a TCAP message and transmit the TCAP message via a signal connection control part message to the signalling transfer point 7.

The signalling transfer point would then route the message to the service control point 6A which would then process the AIN TCAP message by searching its data base for the subscriber name which correlates to the directory number. The service control point would then formulate a TCAP message containing the correlated subscriber name and directory number. This is sent in a Return Result component and in a Response Package Type. The TCAP message carried in a signalling connection control part message would then be routed by the signalling transfer point 7 to the switch 4. The switch 4 would then formulate a RELEASE COMPLETE ISDN message containing a Facility Information Element indicating a Return Result component that contains the correlated subscriber name and directory number. This message would then be transmitted to the service node to provide the service node with the identity of the calling party.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

One such variation that can be devised to possibly simplify the switch conversion process involves altering the mapping of the components received in the TCAP messages to the ISDN components. This variation would map all the components received in TCAP to a single component on the ISDN interface. In this case, a TCAP component containing a Return Result, Return Error, Reject would be mapped to a single ISDN Return Result component. The switch would map the relevant information received in the TCAP component into parameters of the ISDN Return Result component. Various variations of this scheme are possible based on the principle presented herein.

What is claimed:

1. A telephone system comprising:

one or more service nodes each including means for establishing one or more first channels carrying one or more of voice and data information and at least one second channel for carrying one or more of telephone network access control and signalling information;

a central office switch for providing for each service node call processing for calls over said one or more first channels of that service node in response to signalling on said at least one second channel of that service node;

one or more service control points each for communicating with said central office switch for providing information to and receiving information from said central office switch;

said central office switch being further adapted to have an advanced intelligence network ("AIN") non-call associated signalling service which permits a given service node to access a given service control point through said central office switch and utilizing the at least one second channel of that given service node.

2. A telephone system in accordance with claim 1 wherein:

said AIN non-call associated signalling service of said switch further permits a given service control point to access through said switch a given service node utilizing the at least one second channel of that given service node.

3. A telephone system in accordance with claim 1 wherein:

a first service control point includes means for correlating subscriber names and directory numbers;

and a given service node accesses said first service control point to request said first service control point to correlate the directory number of a calling party to a subscriber name.

4. A telephone system in accordance with claim 1 wherein:

at least one of said service nodes is a smart private branch exchange ("PBX").

5. A telephone system in accordance with claim 1 wherein:

at least one of said service nodes is a smart phone.

6. A telephone system in accordance with claim 1 wherein:

said one or more first channels and said at least one second channel are integrated services digital network ("ISDN") channels;

and the one or more of the telephone network access control and signalling information carried by said at least one second channel comprises ISDN non-called associated signalling which is processed by said central office switch utilizing ISDN Common Element Procedures.

7. A telephone system in accordance with claim 1 wherein:

each service node includes means for generating non-call associated signalling messages each containing an identifier which said central office switch recognizes as invoking said AIN non-call associated signalling service of said central office switch, said non-call associated signalling messages of a given service node being supplied to the at least one second channel of that service node;

and each service control point includes means for generating non-call associated signalling messages each containing an identifier which said central office switch recognizes as invoking said AIN non-called associated signalling service.

8. A telephone system in accordance with claim 7 wherein:

the system further comprises for each service node, a first interface means for interfacing that service node with said central office switch, the first interface means associated with a given service node supporting the one or more first channels of that service node and the at least one second channel of that service node;

the non-call associated signalling messages of each service node are generated as first interface type messages defined by the first interface means associated with that service node;

the system further comprises for each service control point, second interface means for interfacing that service control point with said central office switch, and the non-call associated signalling messages of each service control point are generated as second interface type messages defined by the second interface means associated with that service control point.

9. A telephone system in accordance with claim 8 wherein:

said central office switch, in response to each first interface type message of a first interface from a given service node and directed to a given service control point converts the message to a second interface type message associated with the given service control point and supplies the converted second interface type message to the second interface associated with the given service control point for receipt by the given service control point;

and said central office switch, in response to each second interface type message of a second interface from a given service control point and directed to a given service node converts the second interface type message into a first interface type message associated with the given service node and supplies the converted first interface type message to the first interface associated with the given service node for receipt by the given service node.

10. A telephone system in accordance with claim 9 wherein:

each said conversion of by said central office switch of a first interface type message to a said second interface type message retains the origination address, destination address and message contents contained in the first interface type message;

each said conversion by said central office switch of a second interface type message to a first interface type message retains the origination address, destination address and message contents of the second interface type message.

11. A telephone system in accordance with claim 10 wherein:

each said first interface is an integrated services digital network ("ISDN") interface and each said first interface type message is an ISDN message;

each said second interface is a signalling system 7 ("SS7") interface and each said second interface type message is a transaction capabilities application part ("TCAP") message.

12. A telephone system in accordance with claim 11 wherein:

said central office switch in converting each said first interface type message to a second interface type message utilizes Common Element ISDN Procedures.

13. A telephone system in accordance with claim 11 wherein:

said access permitted by said switch of a given service node to a given service control point permits messages originating at said given service node to be conveyed to said given service control point and acknowledgements of said messages originating at said given service node to be conveyed from said given service control point to said given service node.

14. A telephone system in accordance with claim 11 wherein:

said AIN non-call associated signalling service of said switch further permits a given service control point to access through said switch a given service node utilizing the at least one second channel of that service node.

15. A telephone system in accordance with claim 14 wherein:

said access permitted by said switch of a given service node to a given service control point permits messages originating at said given service node to be conveyed to said given service control point and acknowledgements of said messages originating at said given service node to be conveyed from said given service control point to said given service node;

and said access permitted by said switch of a given service control point to a given service node permits messages originating at said given service control point to be conveyed to said given service node and acknowledgements of said messages originating at said given service control point to be conveyed from said given service node to said given service control point.

16. A method for use in telephone system operation comprising:

establishing one or more first channels for carrying one or more of voice and data information and at least one second channel for carrying one or more of telephone network access control and signalling information for one or more service nodes, processing calls via a central office switch over said one or more first channels of each service node in response to signalling on said at least one second channel of that service node;

establishing one or more service control points each for communicating with said central office switch for providing information to and receiving information from said central office switch;

establishing via said central office switch an advanced intelligent network ("AIN") non-call associated signalling service which permits a given service node to access a given service control point through said central office switch utilizing the at least one second channel of that given service node.

17. A method in accordance with claim 16 wherein:

said AIN non-call associated signalling service further permits a given service control point to access through said switch a given service node utilizing the at least one second channel of that given service node.

18. A method in accordance with claim 16 further comprising:

correlating subscriber names and directory numbers at a first service control point;

and said step of establishing said AIN non-call associated signalling service includes permitting a given service node to access said first service control point to request said first service control point to correlate the directory number of a calling party to a subscriber name.

19. A method in accordance with claim 16 wherein:

said one or more first channels and said at least one second channel are integrated services digital network ("ISDN") channels;

and the one or more of the telephone network access control and signalling information carried by said at least one second channel comprises ISDN non-called associated signalling which is processed by said central office switch utilizing ISDN Common Element Procedures.

20. A method in accordance with claim 16 wherein:

for each service node, generating non-call associated signalling messages each containing an identifier which said central office switch recognizes as invoking said AIN non-call associated signalling service, and supplying said non-call associated signalling messages of a given service node to the at least one second channel of that service node;

and for each service control point, generating non-call associated signalling messages each containing an identifier which said central office switch recognizes as invoking said AIN non-called associated signalling service.

21. A method in accordance with claim 20 wherein:

said method further comprises for each service node, first interfacing the one or more first channels of that service node and the at least one second channel of that service node with said central office switch;

the non-call associated signalling messages of each service node are generated as first interface type messages defined by said first interfacing associated with that service node;

the method further comprises for each service control point, second interfacing that service control point with said central office switch;

and the non-call associated signalling messages of each service control point are generated as second interface type messages defined by the second interfacing associated with that service control point.

22. A method in accordance with claim 21 wherein:

in response to each first interface type message of said first interfacing from a given service node and directed to a given service control point said establishing of said AIN non-call associated signalling service includes converting the first interface type message to a second interface type message associated with the given service control point and supplying the converted second interface type message via the second interfacing associated with the given service control point to the given service control point;

and in response to each second interface type message of said second interfacing from a given service control point and directed to a given service node said establishing of said AIN non-call associated signalling service includes converting the second interface type message into a first interface type message associated with the given service node and supplying the converted first interface type message via the first interfacing associated with the given service node to the given service node.

23. A method in accordance with claim 22 wherein:

each said conversion of a first interface type message to a second interface type message retains the origination address, destination address and message contents contained in the first interface type message;

and each said conversion of a second interface type message to a first interface type message retains the origination address, destination address and message contents of the second interface type message.

24. A method in accordance with claim 23 wherein:

said first interfacing is integrated services digital network ("ISDN") interfacing and each said first interface type message is an ISDN message;

said second interfacing is a signal system 7 ("SS7") interfacing and each said second interface type message is a transaction capabilities application part ("TCAP") message.

25. A method in accordance with claim 24 wherein:

said converting of each said first interface type message to a second interface type message utilizes Common Element ISDN Procedures.

26. A method in accordance with claim 24 wherein:

said access permitted of a given service node to a given service control point permits messages originating at said given service node to be conveyed to said given service control point and acknowledgements of said messages originating at said given service node to be conveyed from said given service control point to said given service node.

27. A method in accordance with claim 24 wherein:

said AIN non-call associated signalling service of said switch further permits a given service control point to access through said switch a given service node utilizing the at least one second channel of that service node.

28. A method in accordance with claim 27 wherein:

said access permitted of a given service node to a given service control point permits messages originating at said given service node to be conveyed to said given service control point and acknowledgements of said messages originating at said given service node to be conveyed from said given service control point to said given service node;

and said access permitted of a given service control point to a given service node permits messages originating at said given service control point to be conveyed to said given service node and acknowledgements of said messages originating at said given service control point to be conveyed from said given service node to said given service control point.

29. A central office switch for use with:

one or more service nodes each including means for establishing one or more first channels for carrying one or more of voice and data information and at least one second channel for carrying one or more of telephone network access control and signalling information; one or more service control points each for communicating with said central office switch for providing information to and receiving information from said central office switch; said central office switch comprising:

means for providing for each service node call processing for calls over said one or more first channels of that service node in response to signalling on said at least second channel of that service node; and said central office switch being further adapted to have an advanced intelligent network ("AIN") non-call associated signalling service which permits a given service node to access a given service control point through said switch and utilizing the at least one second channel of that given service node.

30. A central office switch in accordance with claim 29 wherein:

said AIN non-call associated signalling service of said switch further permits a given service control point to access through said switch a given service node utilizing the at least one second channel of that given service node.

31. A central office switch in accordance with claim 29 wherein:

said one or more first channels and said at least one second channel are integrated services digital network ("ISDN") channels;

and the one or more of the telephone network access control and signalling information carried by said at least one second channel comprises ISDN non-called associated signalling which is processed by said central office switch utilizing ISDN Common Element Procedures.

32. A central office switch in accordance with claim 29 wherein: each service node includes means for generating non-call associated signalling messages each containing an identifier which said central office switch recognizes as invoking said AIN non-call associated signalling service of said central office switch, said non-call associated signalling messages of a given service node being supplied to the at least one second channel of that service node; each service control point includes means for generating non-call associated signalling messages each containing an identifier which said central office switch recognizes as invoking said AIN non-called associated signalling service; the central office switch is for further use with for each service node, a first interface means for interfacing that service node with said central office switch, the first interface means associated with a given service node supporting the one or more first channels of that service node and the at least one second channel of that service node; the non-call associated signalling messages of each service node are generated as first interface type messages defined by the first interface means associated with that service node; the central office switch is for further use with for each service control point, second interface means for interfacing that service control point with said central office switch; and the non-call associated signalling messages of each service control point are generated as second interface type messages defined by the second interface means associated with that service control point; and wherein said central office switch, in response to each first interface type message of a first interface from a given service node and directed to a given service control point converts the message to a second interface type message associated with the given service control point and supplies the converted second interface type message to the second interface associated with the given service control point for receipt by the given service control point;

and said central office switch, in response to each second interface type message of a second interface from a given service control point and directed to a given service node converts the second interface type message into a first interface type message associated with the given service node and supplies the converted first interface type message to the first interface associated with the given service node for receipt by the given service node.

33. A central office switch in accordance with claim 32 wherein:

each said conversion by said central office switch of a first interface type message to a said second interface type message retains the origination address, destination address and message contents contained in the first interface type message;

each said conversion by said central office switch of a second interface type message to a first interface type message retains the origination address, destination address and message contents of the second interface type message.

34. A central office switch in accordance with claim 33 wherein:

each said first interface is an integrated services digital network ("ISDN") interface and each said first interface type message is an ISDN message;

each said second interface is a signalling system 7, ("SS7") interface and each said second interface type message is a transaction capabilities application part ("TCAP") message.

35. A central office switch in accordance with claim 34 wherein:

said central office switch in converting each said first interface type message to a second interface type message utilizes Common Element ISDN Procedures.

36. A central office switch in accordance with claim 34 wherein:

said access permitted by said switch of a given service node to a given service control point permits messages originating at said given service node to be conveyed to said given service control point and acknowledgements of said messages originating at said given service node to be conveyed from said given service control point to said given service node.

37. A central office switch in accordance with claim 34 wherein:

said AIN non-call associated signalling service of said switch further permits a given service control point to access through said switch a given service node utilizing the at least one second channel of that service node.

38. A central office switch in accordance with claim 37 wherein:

said access permitted by said switch of a given service node to a given service control point permits messages originating at said given service node to be conveyed to said given service control point and acknowledgements of said messages originating at said given service node to be conveyed from said given service control point to said given service node;

and said access permitted by said switch of a given service control point to a given service node permits messages originating at said given service control point to be conveyed to said given service node and acknowledgements of said messages originating at said given service control point to be conveyed from said given node to said given service control point.

39. A service node for use with: a central office switch for providing for said service node call processing for calls over one or more first channels for carrying one or more of voice and data information of that service node in response to signalling on at least one second channel for carrying one or more of telephone network access control and signalling information of that service node; one or more service control points each for communicating with said central office switch for providing information to and receiving information from said central office switch; said central office switch being further adapted to have an advanced intelligent network ("AIN") non-call associated signalling service which permits said service node to access a given service control point through said switch and utilizing the at least one second channel of said service node; said service node comprising:

means for establishing one or more first channels for carrying one or more of voice and data information and at least one second channel for carrying one or more of telephone network access control and signalling information; and means for generating non-call associated signalling messages each containing an identifier which said central office switch recognizes as invoking said AIN non-call associated signalling service of said central office switch, said non-call associated signalling messages of a given service node being supplied to the at least one second channel of that service node.

40. A service node in accordance with claim 39 wherein:

said one or more first channels and said at least one second channel are integrated services digital network ("ISDN") channels;

and the one or more of the telephone network access control and signalling information carried by said at least one second channel comprises ISDN non-called associated signalling which is processed by said central office switch utilizing ISDN Common Element Procedures.

41. A service control point for use with: one or more service nodes each including means for establishing one or more first channels for carrying one or more of voice and data information and at least one second channel for carrying one or more of telephone network access control and signalling information; a central office switch for providing for each service node call processing for calls over said one or more first channels of that service node in response to signalling on said at least one second channel of that service node; said central office switch being further adapted to have an advanced intelligent network ("AIN") non-call associated signalling service which permits a given service node to access a given service control point through said switch and utilizing the at least one second channel of that given service node; said service control point comprising:

means for communicating with said central office switch for providing information to and receiving information from said central office switch; and means for generating non-call associated signalling messages each containing an identifier which said central office switch recognizes as invoking said AIN non-called associated signalling service.

42. A service control point in accordance with claim 41 wherein:

said one or more first channels and said at least one second channel are integrated services digital network ("ISDN") channels;

and the one or more of the telephone network access control and signalling information carried by said at least one second channel comprises ISDN non-called associated signalling which is processed by said central office switch utilizing ISDN Common Element Procedures.

43. A service control point for use with: one or more service nodes each including means for establishing one or more first channels for carrying one or more of voice and data information and at least one second channel for carrying one or more of telephone network access control and signalling information; a central office switch for providing for each service node call processing for calls over said one or more first channels of that service node in response to signalling on said at least one second channel of that service node; said central office switch being further adapted to have an advanced intelligent network ("AIN") non-call associated signalling service which permits said service control point to access a given service node through said switch and utilizing the at least one second channel of that given service node; said service control point comprising:

means for communicating with said central office switch for providing information to and receiving information from said central office switch; and means for generating non-call associated signalling messages each containing an identifier which said central office switch recognizes as invoking said AIN non-called associated signalling service.

44. A service control point in accordance with claim 43 wherein:

said one or more first channels and said at least one second channel are integrated services digital network ("ISDN") channels;

and the one or more of the telephone network access control and signalling information carried by said at least one second channel comprises ISDN non-called associated signalling which is processed by said central office switch utilizing ISDN Common Element Procedures.

* * * * *

UNITED STATES PATENT AND TRADEMARK OFFICE
CERTIFICATE OF CORRECTION

PATENT NO. : 5,499,290
DATED : March 12, 1996
INVENTOR(S) : Karl Koster

It is certified that error appears in the above-indentified patent and that said Letters Patent is hereby corrected as shown below:

Col. 10, line 52, change "En___v" to -- Env___ --.

Col. 11, line 2, change "TCA___P" to -- TCAP___ --.

Col. 13, line 50, change "TCA___P" to -- TCAP___ --.

Signed and Sealed this

Sixth Day of August, 1996

Attest:

BRUCE LEHMAN

Attesting Officer        Commissioner of Patents and Trademarks